(12) United States Patent
Muto et al.

(10) Patent No.: US 10,348,213 B2
(45) Date of Patent: Jul. 9, 2019

(54) DC-DC CONVERTER

(71) Applicant: Murata Manufacturing Co., Ltd., Nagaokakyo-shi, Kyoto-fu (JP)

(72) Inventors: Takami Muto, Nagaokakyo (JP); Takayoshi Nishiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/149,283

(22) Filed: Oct. 2, 2018

(65) Prior Publication Data
US 2019/0044450 A1 Feb. 7, 2019

Related U.S. Application Data

(63) Continuation of application No. PCT/JP2017/011580, filed on Mar. 23, 2017.

(30) Foreign Application Priority Data

Apr. 25, 2016 (JP) .................................. 2016-087447

(51) Int. Cl.
*H02M 3/335* (2006.01)
*H02M 3/28* (2006.01)
*H02M 1/08* (2006.01)

(52) U.S. Cl.
CPC ......... *H02M 3/33592* (2013.01); *H02M 1/08* (2013.01); *H02M 3/28* (2013.01)

(58) Field of Classification Search
CPC ............ H02N 1/08; H02N 1/088; H02N 3/28; H02N 3/335; H02N 3/33592
See application file for complete search history.

(56) References Cited

U.S. PATENT DOCUMENTS 5,303,138 A 4/1994 Rozman
5,528,483 A 6/1996 Mohandes
(Continued)

FOREIGN PATENT DOCUMENTS

JP 06-327243 A 11/1994
JP 08-182311 A 7/1996
(Continued)

OTHER PUBLICATIONS

Official Communication issued in International Patent Application No. PCT/JP2017/011580, dated Jun. 13, 2017.

*Primary Examiner* — Matthew V Nguyen
(74) *Attorney, Agent, or Firm* — Keating & Bennett, LLP

(57) ABSTRACT

A DC-DC converter includes a voltage input portion that receives a DC voltage, a voltage output portion to which a load is connected, a transformer that includes at least a primary winding and a secondary winding, a main switch element between the voltage input portion and the primary winding of the transformer, a rectifier circuit between the voltage output portion and the secondary winding of the transformer, and a reset voltage suppressing circuit that detects a magnitude of a reset voltage generated when excitation energy accumulated in the transformer is reset and reduces a voltage which is applied to the main switch element when the magnitude of the reset voltage exceeds, for example, a predetermined threshold value.

13 Claims, 16 Drawing Sheets

(56) References Cited

U.S. PATENT DOCUMENTS

| | | | | |
|---|---|---|---|---|
| 6,040,987 A * | 3/2000 | Kudo | ................ | H02M 3/33592 363/131 |
| 6,081,432 A * | 6/2000 | Rinne | ................ | H02M 3/33569 363/16 |
| 6,414,861 B1 * | 7/2002 | Matsumoto | ....... | H02M 3/33592 363/127 |
| 2002/0131277 A1 | 9/2002 | Takegami | | |
| 2017/0070151 A1 * | 3/2017 | Lin | ........................ | H02M 1/08 |

FOREIGN PATENT DOCUMENTS

| JP | 2000014136 | * | 1/2000 | ............. H02M 3/28 |
|---|---|---|---|---|
| JP | 2002-233143 A | | 8/2002 | |
| JP | 2002-272107 A | | 9/2002 | |
| JP | 2006-340562 A | | 12/2006 | |
| JP | 2009-296770 A | | 12/2009 | |

* cited by examiner

DC-DC CONVERTER

CROSS REFERENCE TO RELATED APPLICATIONS

This application claims the benefit of priority to Japanese Patent Application No. 2016-087447 filed on Apr. 25, 2016 and is a Continuation Application of PCT Application No. PCT/JP2017/011580 filed on Mar. 23, 2017. The entire contents of each application are hereby incorporated herein by reference.

BACKGROUND OF THE INVENTION

1. Field of the Invention

The present invention relates to a DC-DC converter including a transformer and a switching element, and more particularly, to a DC-DC converter in which a reset voltage is generated in a transformer.

2. Description of the Related Art

In a DC-DC converter in which a current flowing through a primary winding of a transformer is asymmetric in terms of positive and negative phases, i.e., in which excitation and reset of the transformer are driven in an asymmetrical relationship, the transformer is excited by the current flowing through the primary winding when a switching element (a main switch element) connected to the primary winding of the transformer is turned ON, and a voltage (a voltage called a reset voltage or a flyback voltage) caused by counter electromotive force is generated in the primary winding when the main switch element is turned OFF. For example, in both of a forward DC-DC converter and a flyback DC-DC converter, the above-described reset voltage is generated when resetting the transformer.

Japanese Unexamined Patent Application Publication No. 6-327243 discloses a DC-DC converter in which a synchronous rectifier switch element is provided on a secondary winding side of a transformer, wherein a series circuit of a clamp switch element and a capacitor is connected to both ends of a main switch element connected to a primary winding of the transformer, and an ON time of the synchronous rectification switch element is not affected by variation in a reset voltage by turning ON the clamp switch element when the main switch element is turned OFF.

A forward DC-DC converter including an active clamp circuit and a synchronous rectifier circuit as disclosed in Japanese Unexamined Patent Application Publication No. 6-327243 has an advantage of high power conversion efficiency. In such a forward-type DC-DC converter, when an output voltage is stabilized by PWM control, as a variation range of an input power supply voltage and a variation range of a load current increase, an on-duty of the main switch element varies over a wide range.

The reset voltage which is applied to the main switch element is obtained by Vin (input voltage)×Ton (ON period)/Toff (OFF period). Accordingly, as the on-duty of the main switch element becomes longer, that is, as the OFF period of the main switch element becomes shorter, the reset voltage rapidly increases. That is, in a situation where the on-duty of the main switch element varies greatly as described above, when the on-duty becomes large, the reset voltage largely increases.

FIG. 16 illustrates an example of a relationship between the input voltage to the DC-DC converter and the reset voltage. In FIG. 16, the horizontal axis represents the input voltage to the DC-DC converter and the vertical axis represents the reset voltage. Numerical values of the voltage are merely examples, and a typical example of the relationship between the input voltage to the DC-DC converter and the reset voltage generated in the primary winding or the secondary winding of the transformer is illustrated herein. Thus, as the input voltage decreases (as the on-duty becomes larger), the reset voltage rapidly increases.

The reset voltage is applied to the main switch element when the main switch element is turned OFF. Further, when the synchronous rectifier circuit is provided, the reset voltage which is generated in the secondary winding of the transformer is applied to the synchronous rectifier switch element. Therefore, in the DC-DC converter having the wide variation range of the input power supply voltage and the wide variation range of the load current of the DC-DC converter, a FET with a high breakdown voltage is required for the main switch element and the synchronous rectifier switch element. However, the higher the breakdown voltage of the FET is, the higher the on-resistance (Ron) thereof is, so that loss in the FET is large and the power conversion efficiency of the DC-DC converter is inevitably lowered.

SUMMARY OF THE INVENTION

Preferred embodiments of the present invention to provide DC-DC converters that are each capable of improving power conversion efficiency by eliminating a problem caused by an increase in a reset voltage which is generated in a transformer.

A DC-DC converter according to a preferred embodiment of the present invention includes a voltage input portion that receives a DC voltage; a voltage output portion to which a load is connected; a transformer that includes at least a primary winding and a secondary winding; a main switch element that is provided between the voltage input portion and the primary winding of the transformer; a rectifier circuit that is provided between the voltage output portion and the secondary winding of the transformer; and a reset voltage suppressing circuit that detects a magnitude of a reset voltage which is generated when excitation energy accumulated in the transformer is reset and reduces a voltage which is applied to the main switch element in accordance with the magnitude of the reset voltage.

With this configuration, an upper limit of the reset voltage which is generated in the primary winding of the transformer is restricted, and accordingly, a switching element with low breakdown voltage is able to be used.

In a DC-DC converter according to a preferred embodiment of the present invention, it is preferable that the reset voltage suppressing circuit reduces the voltage which is applied to the main switch element when the magnitude of the reset voltage exceeds a predetermined threshold value. With this configuration, during normal operation in which the reset voltage does not exceed the predetermined threshold value, stability of an output voltage is able to be maintained.

In a DC-DC converter according to a preferred embodiment of the present invention, it is preferable that the rectifier circuit is a synchronous rectifier circuit which includes a rectifier switch element provided between the voltage output portion and the secondary winding of the transformer and switches the rectifier switch element in synchronization with variation in a secondary winding voltage of the transformer. This configuration reduces loss in the rectifier circuit. Further, the upper limit of the reset voltage is restricted, so that the breakdown voltage of the synchronous rectifier switch element with respect to the reset voltage which is generated in the secondary winding of the transformer is also moderated.

In a DC-DC converter according to a preferred embodiment of the present invention, the reset voltage suppressing circuit may detect the magnitude of the reset voltage using a voltage which is applied to the rectifier switch element. With this configuration, the reset voltage suppressing circuit is able to be provided on the secondary side of the transformer, and a control signal is able to be easily supplied to a control circuit on the secondary side of the transformer.

In a DC-DC converter according to a preferred embodiment of the present invention, the reset voltage suppressing circuit may detect the magnitude of the reset voltage using a voltage which is applied to the main switch element. With this configuration, the reset voltage suppressing circuit is able to be provided on the secondary side of the transformer, and a control signal is able to be easily supplied to a control circuit on the secondary side of the transformer.

In a DC-DC converter according to a preferred embodiment of the present invention, the transformer may include an auxiliary winding, and the reset voltage suppressing circuit may detect the magnitude of the reset voltage using a voltage of the auxiliary winding of the transformer. With this configuration, the reset voltage suppressing circuit is able to be substantially separated from a converter circuit including the main switch element and the transformer, and the circuit configuration is able to be simplified.

In a DC-DC converter according to a preferred embodiment of the present invention, the reset voltage suppressing circuit is a circuit which reduces an on-duty of the main switch element, for example. With this configuration, control is able to be easily performed by only providing the circuit that controls the on-duty of the main switch element with a control signal. In other words, the circuit is able to be simplified.

In a DC-DC converter according to a preferred embodiment of the present invention, the reset voltage suppressing circuit is a circuit that keeps the main switch element in an OFF state, for example. With this configuration, control is able to be easily performed by only providing the circuit that controls the on-duty of the main switch element with the control signal. In other words, the circuit is able to be simplified.

In a DC-DC converter according to a preferred embodiment of the present invention, the main switch element is an FET, for example, and an active clamp circuit which is connected in parallel between a drain and a source of the main switch element and restricts the reset voltage which is applied to the main switch element is provided. With this configuration, the condition that the reset voltage reaches the upper limit is moderated and the reset voltage which is generated in the primary winding of the transformer is reduced or prevented by the active clamp circuit. Therefore, a maximum value of the on-duty of the main switch element is able to be increased. Thus, a lower limit of an input power supply voltage or an upper limit of a load current is able to be further decreased or increased, respectively.

According to preferred embodiments of the present invention, an upper limit of a reset voltage which is generated in a primary winding of a transformer is restricted, and accordingly, switching elements with low breakdown voltages are able to be used. Further, since a FET with low on-resistance is able to be used for a main switch element, DC-DC converters with high power conversion efficiencies are able to be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
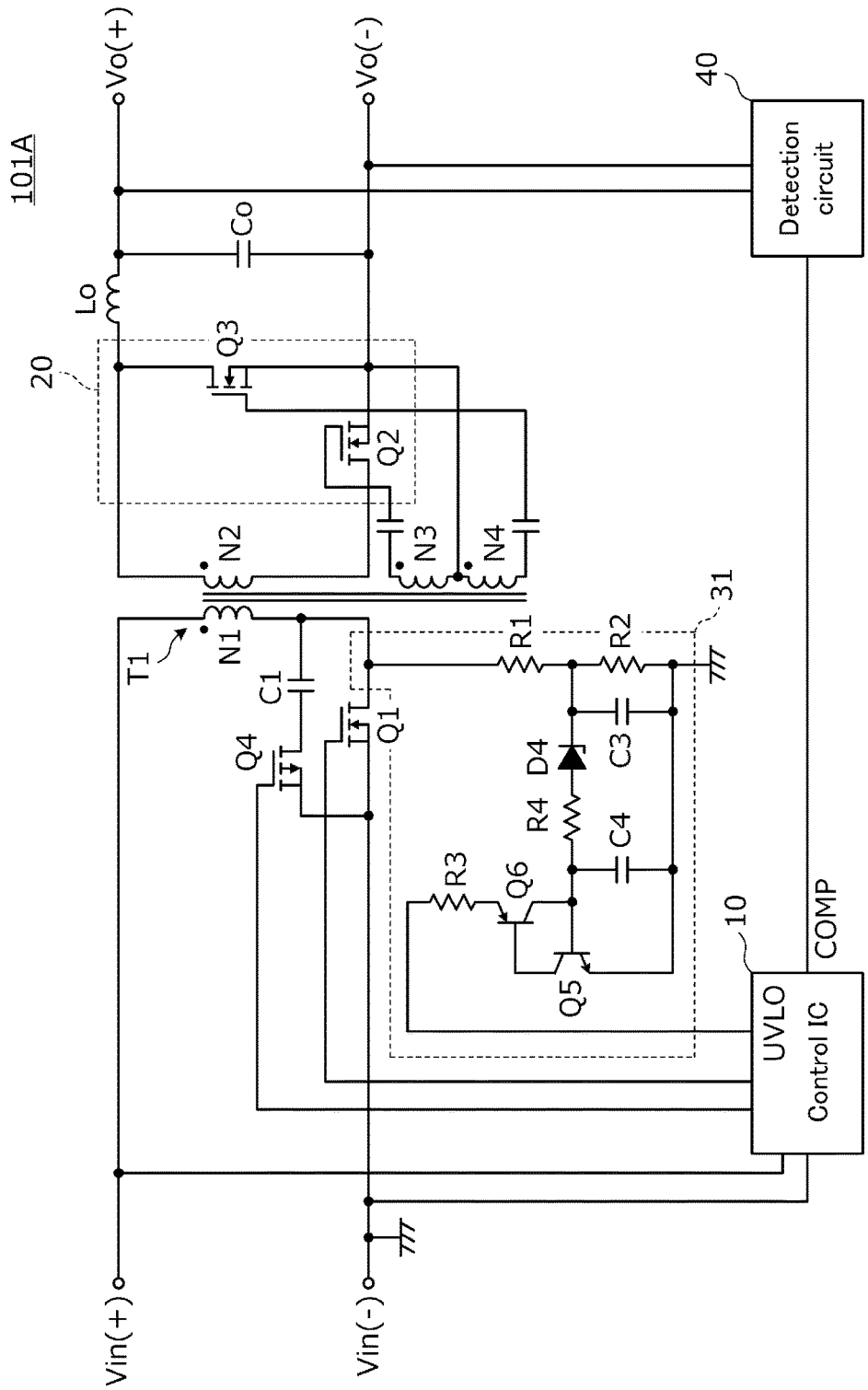
FIG. 1 is a circuit diagram of a DC-DC converter 101A according to a first preferred embodiment of the present invention.

Hereinafter, preferred embodiments of the present invention will be described with reference to the accompanying drawings. In the respective drawings, the same reference numerals denote the same elements and components. To facilitate explanation or understanding of the features of the present invention, preferred embodiments are described separately for convenience, but partial replacement or combination of configurations described in different preferred embodiments is possible. In a second preferred embodiment and subsequent preferred embodiments, description of matters common to those in the first preferred embodiment will be omitted and only different points will be described. In particular, similar operational effects with the same configurations will not be described in each preferred embodiment.

First Preferred Embodiment

FIG. 1 is a circuit diagram of a DC-DC converter 101A according to a first preferred embodiment of the present invention. The DC-DC converter 101A includes voltage input portions Vin(+) and Vin(−) that receive a DC voltage, and voltage output portions Vo(+) and Vo(−) to which a load is connected, and converts the DC voltage input to the voltage input portions Vin(+) and Vin(−) into a predetermined stabilized DC voltage and outputs the DC voltage to the load from the voltage output portions Vo(+) and Vo(−). The DC-DC converter 101A includes a transformer T1 including a primary winding N1 and a secondary winding N2. A main switch element Q1 is connected between the voltage input portions Vin(+) and Vin(−) and the primary winding N1 of the transformer T1. A rectifier circuit 20 is provided between the voltage output portions Vo(+) and Vo(−) and the secondary winding N2 of the transformer T1.

The main switch element Q1 is preferably a FET (field emission transistor), for example, and a series circuit of a clamp switch element Q4 and a clamp capacitor C1 is connected in parallel between a drain and a source of the main switch element Q1. In other words, the series circuit of the clamp switch element Q4 and the clamp capacitor C1 defines an active clamp circuit.

A control circuit 10 is connected to the voltage input portions Vin(+) and Vin(−). The control circuit 10 is a switching control IC and supplies a gate signal to the main switch element Q1 and the clamp switch element Q4.

A rectifier switch element Q2 and an inductor Lo are connected in series to the secondary winding N2 of the transformer T1. A commutation switch element Q3 is connected between a connection point of the secondary winding N2 and the inductor Lo and the Vo(−) terminal. The rectifier switch element Q2 and the commutation switch element Q3 define the rectifier circuit 20. An output capacitor Co is connected between the voltage output portions Vo (+) and Vo(−).

A circuit is preferably structured such that the transformer T1 includes auxiliary windings N3 and N4, an electromotive voltage of the auxiliary winding N3 is applied between a gate and a source of the rectifier switch element Q2, and an electromotive voltage of the auxiliary winding N4 is applied between a gate and a source of the commutation switch element Q3. A voltage of the secondary winding N2 of the transformer is indirectly detected by the auxiliary winding N3, and the rectifier switch element Q2 switches in synchronization with variations in a voltage of the auxiliary winding N3.

An output voltage detection circuit 40 is provided on the secondary side of the transformer T1. The output voltage detection circuit 40 detects a voltage across the voltage output portions Vo(+) and Vo(−), and applies a feedback voltage corresponding thereto to a COMP terminal of the control circuit 10.

Here, when an ON time of the main switch element Q1 is represented by Ton, an OFF time thereof is represented by Toff, an on-duty ratio is represented by D, an input voltage is represented by Vin, the number of turns of the primary winding N1 is represented by n1, and the number of turns of the secondary winding N2 is represented by n2, a voltage Vds which is applied between a drain and a source of each switch element has the following relationship.

A reset voltage which is generated in the primary winding N1 of the transformer T1 is expressed as follows:

$$-Vin \cdot Ton/Toff = \{Vin/(1-D) - Vin\}$$

Vds of the main switch element Q1 is expressed as follows:

$$Vin + \{Vin/(1-D) - Vin\} = Vin/(1-D)$$

Vds of the rectifier switch element Q2 is expressed as follows:

$$\{Vin/(1-D) - Vin\} \cdot n2/n1$$

Vds of the commutation switch element Q3 is expressed as follows:

$$Vin \cdot n2/n1.$$

Therefore, as the on-duty of the main switch element Q1 increases (as D approaches 1), Vds of the main switch element Q1 and Vds of the rectifier switch element Q2 rapidly increase.

A reset voltage detection circuit 31 is provided between the drain of the main switch element Q1 and ground (i.e., between the drain and the source of the main switch element Q1). This reset voltage detection circuit 31 detects the magnitude of the reset voltage which is generated when excitation energy accumulated in the transformer T1 is reset, and supplies a control signal to the control circuit 10 when it exceeds a predetermined threshold value.

The main switch element Q1, the transformer T1, the rectifier circuit 20, the inductor Lo, and the output capacitor Co define a forward DC-DC converter circuit. Further, by providing the active clamp circuit including the clamp switch element Q4 and the clamp capacitor C1, the DC-DC converter 101A operates as an active clamp forward converter.

The configuration and operation of the reset voltage detection circuit 31 are as follows. The reset voltage detection circuit 31 includes resistors R1, R2, R3, and R4, capacitors C3 and C4, a Zener diode D4, and transistors Q5 and Q6. The resistors R1 and R2 define a voltage dividing circuit that divides the voltage between the drain and the source of the main switch element Q1, and the capacitor C3 smooths the divided voltage. The Zener diode D4 becomes conductive when a voltage of the capacitor C3 exceeds a Zener voltage of the Zener diode D4. The resistor R4 and the capacitor C4 define a time constant circuit. The two transistors Q5 and Q6 define a latch circuit of a thyristor structure.

When the voltage between the drain and the source of the main switch element Q1 exceeds a predetermined value to make the Zener diode D4 conductive and time corresponding to a time constant of the time constant circuit including the resistor R4 and the capacitor C4 elapses, the transistor Q5 is turned ON. When the transistor Q5 is turned ON, the transistor Q6 is also turned ON and a UVLO terminal of the control circuit 10 is pulled down to a low level. When the transistor Q6 is turned ON, the transistor Q5 and the transistor Q6 are kept in the ON states. As will be described later, when the UVLO terminal of the control circuit 10 reaches the low level, the main switch element Q1 is kept in an OFF state. With this operation, the reset voltage which is generated in the primary winding N1 of the transformer T1 does not rise further, and the main switch element Q1 is protected from the reset voltage. Similarly, the reset voltage which is generated in the secondary winding N2 of the transformer T1 does not rise further, and the rectifier switch element Q2 is protected from the reset voltage.

Note that the time constant circuit including the resistor R4 and the capacitor C4 and the voltage dividing circuit including the resistors R1 and R2 are not essential. The current limiting resistor R3 is not also essential.

According to the present preferred embodiment, the reset voltage which is applied to the main switch element Q1 is restricted by the active clamp circuit including the clamp switch element Q4 and the clamp capacitor C1. With this configuration, the condition that the reset voltage reaches the upper limit is moderated, and a maximum value of the on-duty of the main switch element Q1 is able to be increased. Thus, a lower limit of an input power supply voltage or an upper limit of a load current is able to be further decreased or increased, respectively.

In addition, in the active clamp forward converter, the reset voltage has a rectangular or substantially rectangular waveform. As a result, the reset voltage is able to be easily detected as compared to a resonance reset forward converter in which the reset voltage has a sinusoidal waveform.

Figure 2:
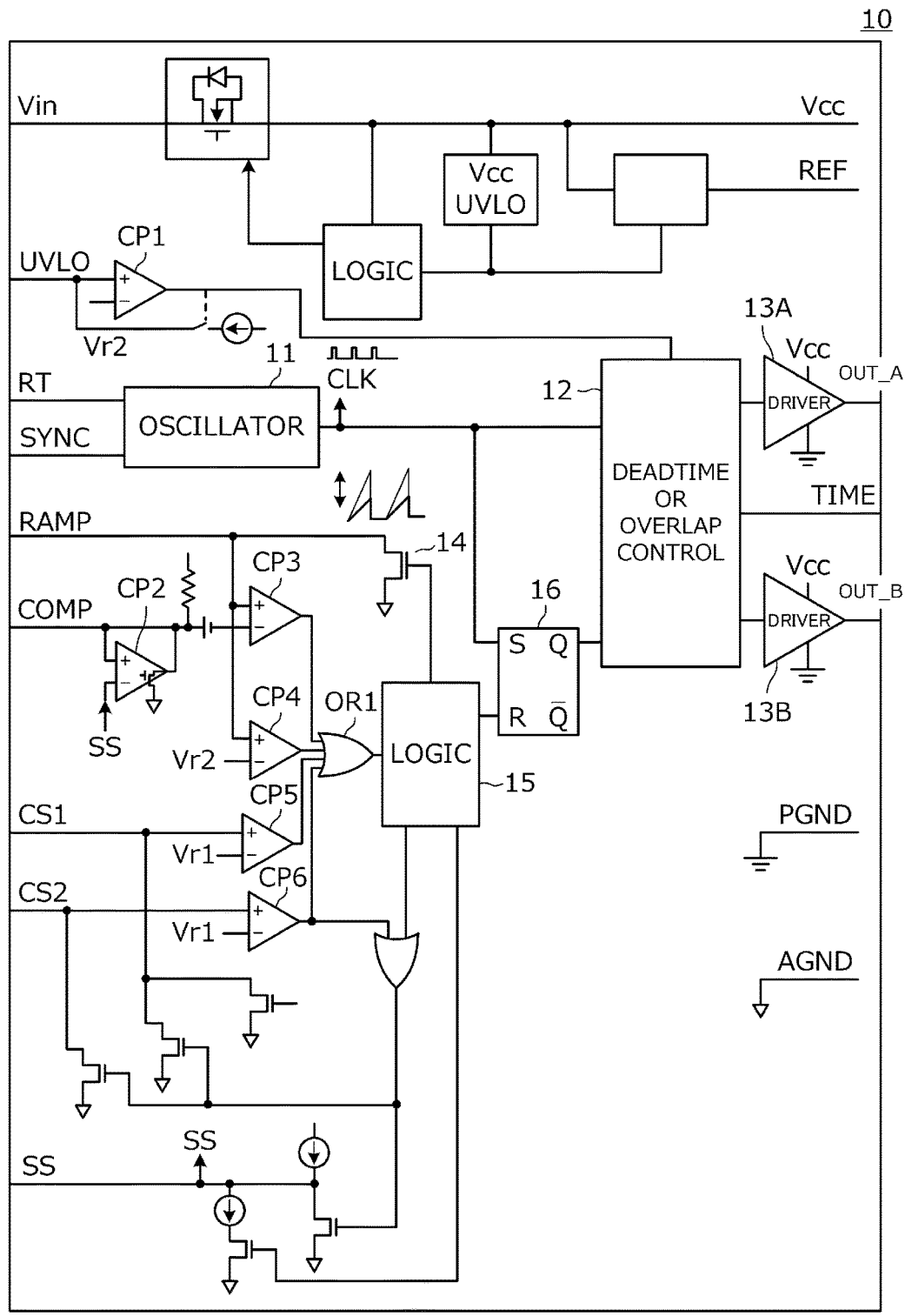
FIG. 2 is a block diagram illustrating the internal configuration of a control circuit (switching control IC) 10.

FIG. 2 is a block diagram illustrating the internal configuration of the control circuit (switching control IC) 10. This switching control IC is preferably, for example, LM5025A manufactured by National Semiconductor Corporation/Texas Instruments Incorporated, or an equivalent thereof. The control circuit 10 includes a voltage input terminal Vin, an OUT_A terminal that outputs the gate signal to a gate of the main switch element Q1, an OUT_B terminal that outputs the gate signal to a gate of the clamp switch element Q4, a COMP terminal that receives a voltage signal which is subject to PWM modulation, a Vin line under-voltage shutdown terminal UVLO, and other suitable components.

Comparators CP2 and CP3, an OR gate OR1, a logic circuit 15, a flip-flop 16, a dead time controller 12, and drivers 13A and 13B are provided between the COMP terminal and the OUT_A terminal and the OUT_B terminal.

The COMP terminal is pulled up by a resistor, and an external circuit, such as a photocoupler, for example, which is connected to the COMP terminal draws a current from the COMP terminal. The comparator CP2 compares an input voltage of a soft start terminal SS with a voltage of the COMP terminal, and the comparator CP3 compares an output voltage of the comparator CP2 with a ramp voltage waveform of a RAMP terminal.

An RC circuit to which a voltage to the voltage input terminal Vin is applied is connected to an external side of the RAMP terminal to generate the ramp voltage waveform. The voltage of the RAMP terminal is reset by the FET 14 being turned ON by an output of the logic circuit 15.

When the ramp voltage waveform and the voltage of the COMP terminal are compared to each other by the comparator CP3, a PWM modulation signal is supplied to the dead time controller 12 through the OR gate OR1, the logic circuit 15, and the flip-flop 16. The control circuit 10 and the output voltage detection circuit 40 that perform the PWM control execute feedback control such that the voltage across the voltage output portions Vo(+) and Vo(−) becomes a predetermined value.

A shutdown comparator CP1, the dead time controller 12, and the drivers 13A and 13B are provided between the UVLO terminal and the OUT_A terminal and the OUT_B terminal. An oscillator 11 is connected to the dead time controller 12.

The dead time controller 12 outputs, to the drivers 13A and 13B, a driving signal having a frequency and an on-duty in accordance with a clock signal output from the oscillator 11 and a Q output signal from the flip-flop 16. Further, the dead time controller 12 receives an output of the shutdown comparator CP1 as an enable signal.

When a UVLO terminal voltage is lower than a threshold value Vr2 of the shutdown comparator CP1, a signal indicating a low level is output. Thus, the dead time controller 12 stops operating, and the OUT_A terminal is held at a low level and the OUT_B terminal is held at a high level.

The SS terminal is a soft start control terminal, and a ramp voltage waveform for soft start control is generated by a constant current charging circuit including a capacitor externally attached to the terminal and an internal constant current circuit. This ramp voltage waveform is input to the comparator CP2. Thus, the PWM control is performed such that the on-duty of the main switch element Q1 gradually increases immediately after the start of the DC-DC converter.

The shutdown comparator CP1 in the control circuit 10 and the reset voltage detection circuit 31 define a reset voltage suppression circuit.

As described above, when the voltage between the drain and the source of the main switch element Q1 illustrated in FIG. 1 exceeds the predetermined value and the UVLO terminal of the control circuit 10 thus becomes the low level, the main switch element Q1 is kept in the OFF state. With this operation, the reset voltage which is generated in the primary winding N1 of the transformer T1 does not rise further, and the main switch element Q1 is protected from the reset voltage. Similarly, the rectifier switch element Q2 is protected from the reset voltage which is generated in the secondary winding N2 of the transformer T1.

Figure 3:
FIG. 3 is a diagram illustrating differences in a reset voltage which is applied to a main switch element Q1 in accordance with the presence or absence of a reset voltage detection circuit 31 illustrated in FIG. 1.

FIG. 3 is a diagram illustrating the difference in the reset voltage which is applied to the main switch element Q1 in accordance with presence or absence of the reset voltage detection circuit 31 illustrated in FIG. 1. In FIG. 3, the horizontal axis represents time and the vertical axis represents the reset voltage which is applied to the main switch element Q1. In FIG. 3, a waveform A indicates characteristics of the DC-DC converter 101A in the present preferred embodiment, which includes the reset voltage detection circuit 31, and a waveform B indicates characteristics of a DC-DC converter in a comparative example, which includes no reset voltage detection circuit 31. In the comparative example, a reset voltage exceeding about 250 V is applied to the main switch element Q1, whereas in the DC-DC converter 101A according to the present preferred embodiment, the reset voltage does not exceed about 250 V and only exceeds about 200 V once. Accordingly, by adding the reset voltage detection circuit 31 to the control circuit 10 to define the reset voltage suppressing circuit, a FET having a breakdown voltage of less than about 250 V is able to be used for the main switch element Q1. Since the FET having the breakdown voltage of less than about 250 V has low on-resistance (Ron), loss in the FET is small and the power conversion efficiency of the DC-DC converter 101A is able to be increased.

In addition, since a voltage obtained by multiplying the reset voltage by a turn ratio of the primary winding N1 and the secondary winding N2 is applied to the rectifier switch element Q2, the voltage which is applied to the rectifier switch element Q2 is also reduced by reducing the reset voltage.

Figure 4:
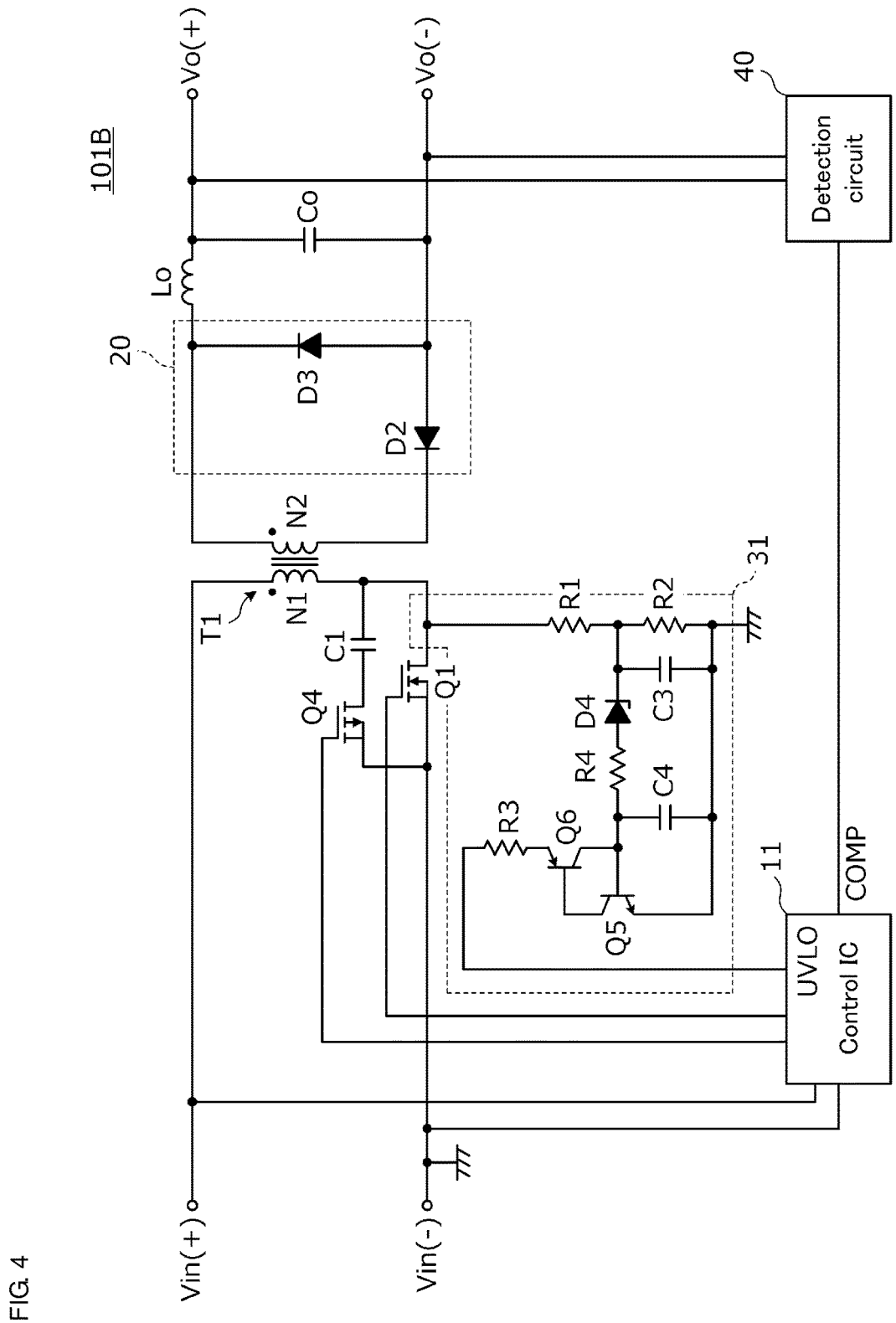
FIG. 4 is a circuit diagram of another DC-DC converter 101B in the first preferred embodiment of the present invention.

FIG. 4 is a circuit diagram of another DC-DC converter 101B according to the first preferred embodiment of the present invention. In the DC-DC converter 101A illustrated in FIG. 1, the rectifier circuit 20 which performs synchronous rectification by the rectifier switch element Q2 and the commutation switch element Q3 is provided. However, in the DC-DC converter 101B, a diode rectifier circuit is provided on the secondary side of the transformer T1. That is, a rectifier diode D2 and the inductor Lo are connected in series to the secondary winding N2 of the transformer T1, and a commutation diode D3 is connected between a connection point between the secondary winding N2 of the transformer T1 and the inductor Lo and the Vo(−) terminal. Other configurations are the same or substantially the same as those of the DC-DC converter 101A.

In this manner, even when the diode rectifier circuit is provided on the secondary side of the transformer, the reset voltage which is applied to the main switch element Q1 is restricted.

Second Preferred Embodiment

A second preferred embodiment of the present invention describes an example of a DC-DC converter in which the configuration of a reset voltage detection circuit is different from that in the first preferred embodiment.

Figure 5:
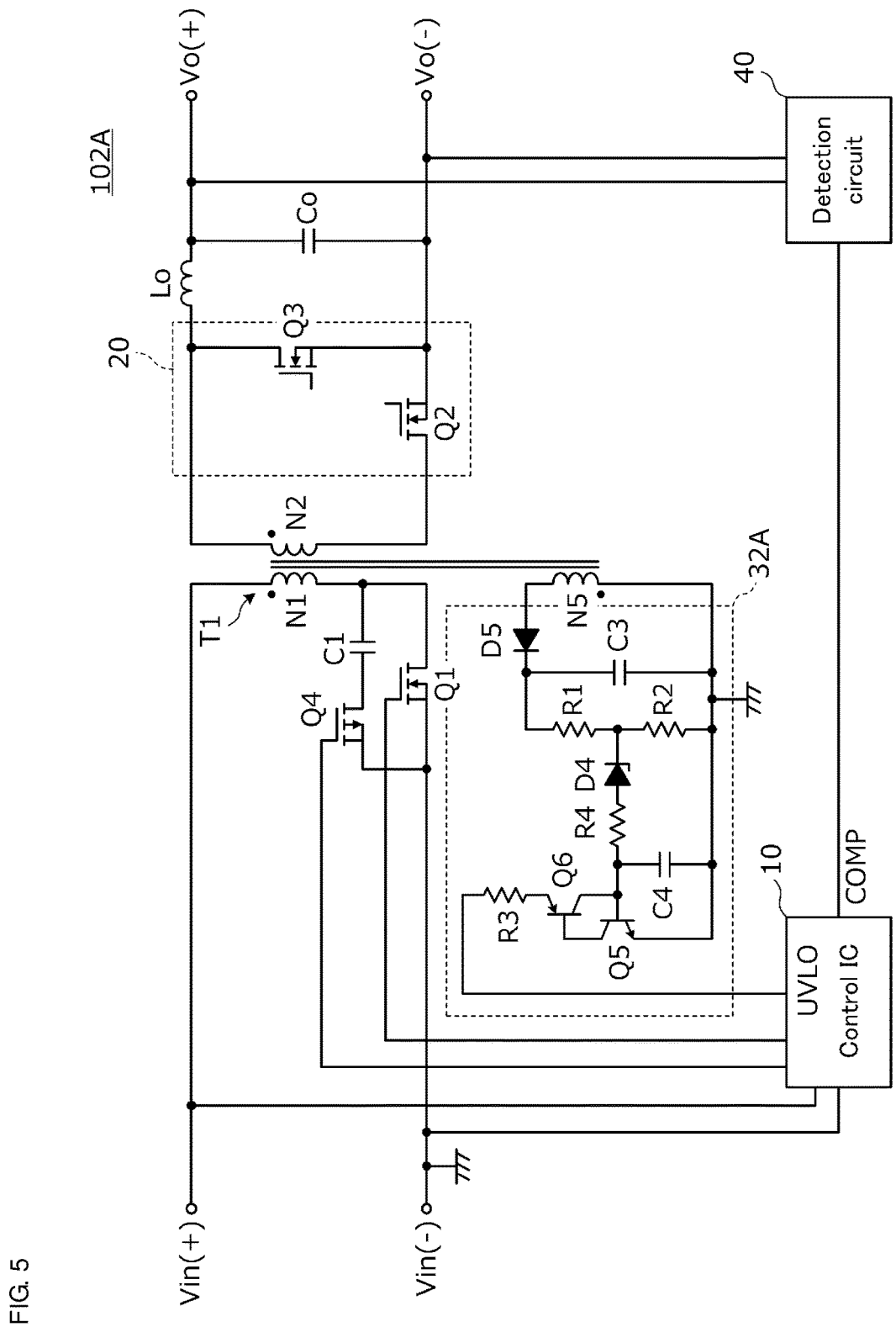
FIG. 5 is a circuit diagram of a DC-DC converter 102A according to a second preferred embodiment of the present invention.

FIG. 5 is a circuit diagram of a DC-DC converter 102A according to the second preferred embodiment. The transformer T1 included in the DC-DC converter 102A has an auxiliary winding N5. A reset voltage detection circuit 32A is connected to the auxiliary winding N5. This reset voltage detection circuit 32A detects, using a voltage of the auxiliary winding N5, the magnitude of a reset voltage which is generated when excitation energy accumulated in the transformer T1 is reset, and supplies a control signal to the control circuit 10 when it exceeds a predetermined threshold value. Other configurations are the same or substantially the same as those of the DC-DC converter 101A described in the first preferred embodiment.

The configuration and operation of the reset voltage detection circuit 32A are as follows. The reset voltage detection circuit 32A includes the resistors R1, R2, R3, and R4, the capacitors C3 and C4, the Zener diode D4, the diode D5, and the transistors Q5 and Q6. The diode D5 rectifies the voltage of the auxiliary winding N5 and the capacitor C3 smooths the voltage. The resistors R1 and R2 define a voltage dividing circuit that divides a voltage of the capacitor C3. The Zener diode D4 becomes conductive when a divided voltage exceeds a Zener voltage of the Zener diode D4. The resistor R4 and the capacitor C4 define a time constant circuit. The two transistors Q5 and Q6 define a latch circuit of a thyristor structure.

Since the voltage of the auxiliary winding N5 of the transformer T1 is proportional to a voltage of the primary winding N1, when the reset voltage which is generated in the primary winding exceeds a predetermined value, the Zener diode D4 becomes conductive. With this, the transistor Q5 is turned ON, the transistor Q6 is also turned ON and the UVLO terminal of the control circuit 10 is pulled down to a low level. As a result, as in the case of the DC-DC converter 101A in the first preferred embodiment, the main switch element Q1 is kept in an OFF state. With this operation, the reset voltage which is generated in the primary winding N1 of the transformer T1 does not rise further, and the main switch element Q1 is protected from the reset voltage. Similarly, the reset voltage which is generated in the secondary winding N2 of the transformer T1 does not rise further, and the rectifier switch element Q2 is protected from the reset voltage.

Figure 6:
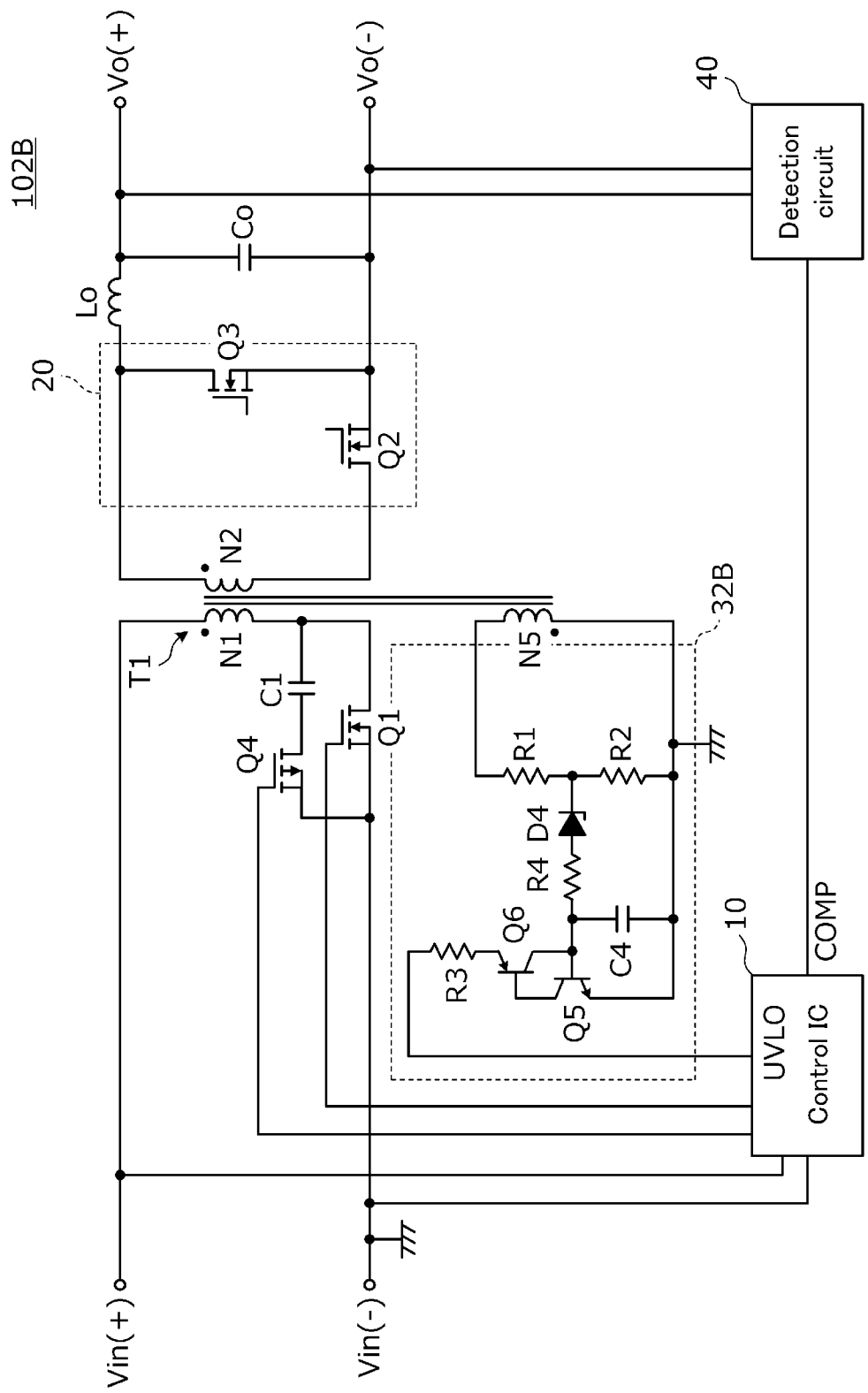
FIG. 6 is a circuit diagram of another DC-DC converter 102B in the second preferred embodiment of the present invention.

FIG. 6 is a circuit diagram of another DC-DC converter 102B according to the second preferred embodiment of the present invention. The DC-DC converter 102B is different from the DC-DC converter 102A illustrated in FIG. 5 in the configuration of a reset voltage detection circuit 32B.

In the reset voltage detection circuit 32B, there is no diode D5 and no capacitor C3 illustrated in FIG. 5. Thus, even if the voltage of the auxiliary winding N5 is not rectified and smoothed, when the voltage which is generated in the auxiliary winding N5 exceeds the predetermined value, the Zener diode D4 becomes conductive. Therefore, by the same action as described above, the reset voltage which is generated in the primary winding N1 and the secondary winding N2 of the transformer T1 is restricted.

Third Preferred Embodiment

A third preferred embodiment of the present invention describes an example of a DC-DC converter including a reset voltage detection circuit on the secondary side of a transformer.

Figure 7:
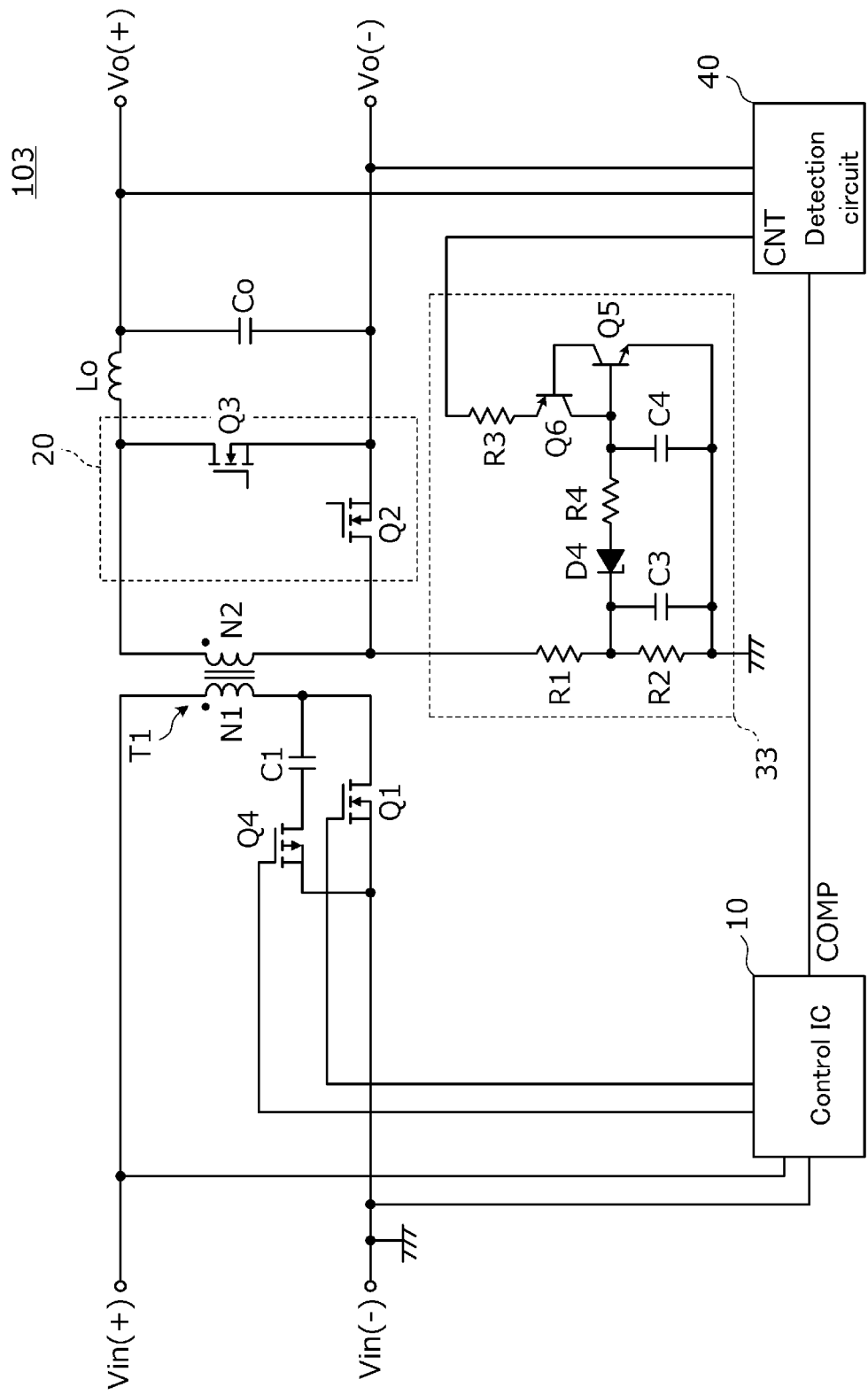
FIG. 7 is a circuit diagram of a DC-DC converter 103 according to a third preferred embodiment of the present invention.

FIG. 7 is a circuit diagram of a DC-DC converter 103 according to the third preferred embodiment. In the DC-DC converter 103, a reset voltage detection circuit 33 is provided between a drain of the rectifier switch element Q2 and the ground (i.e., between the drain and a source of the rectifier switch element Q2). This reset voltage detection circuit 33 detects the magnitude of a reset voltage which is generated in the secondary winding N2 of the transformer T1, and when it exceeds a predetermined threshold value, supplies a control signal to a control terminal CNT of the output voltage detection circuit 40. Specifically, when the reset voltage detection circuit 33 detects that the magnitude of the reset voltage which is generated in the secondary winding N2 of the transformer T1 exceeds the predetermined threshold value, the reset voltage detection circuit pulls down the control terminal CNT of the output voltage detection circuit 40.

The output voltage detection circuit 40 detects a voltage across the voltage output portions Vo(+) and Vo(−), and applies a feedback voltage corresponding to the detected voltage to the COMP terminal of the control circuit 10. Further, the output voltage detection circuit 40 compares a voltage of the control terminal CNT with a reference voltage, and changes an on-duty of the main switch element Q1. Specifically, the output voltage detection circuit 40 changes the feedback voltage such that the on-duty of the main switch element Q1 becomes short with a decrease in the voltage of the control terminal CNT. Thus, the reset voltage which is generated in the primary winding N1 and the secondary winding N2 of the transformer T1 is restricted.

In the present preferred embodiment, the output voltage detection circuit 40, the PWM modulation circuit including the comparators CP2 and CP3 in the control circuit 10, and the reset voltage detection circuit 33 define a reset voltage suppressing circuit.

Fourth Preferred Embodiment

A fourth preferred embodiment of the present invention describes an example of a DC-DC converter which detects a reset voltage on the secondary side of a transformer using a voltage of an auxiliary winding.

Figure 8:
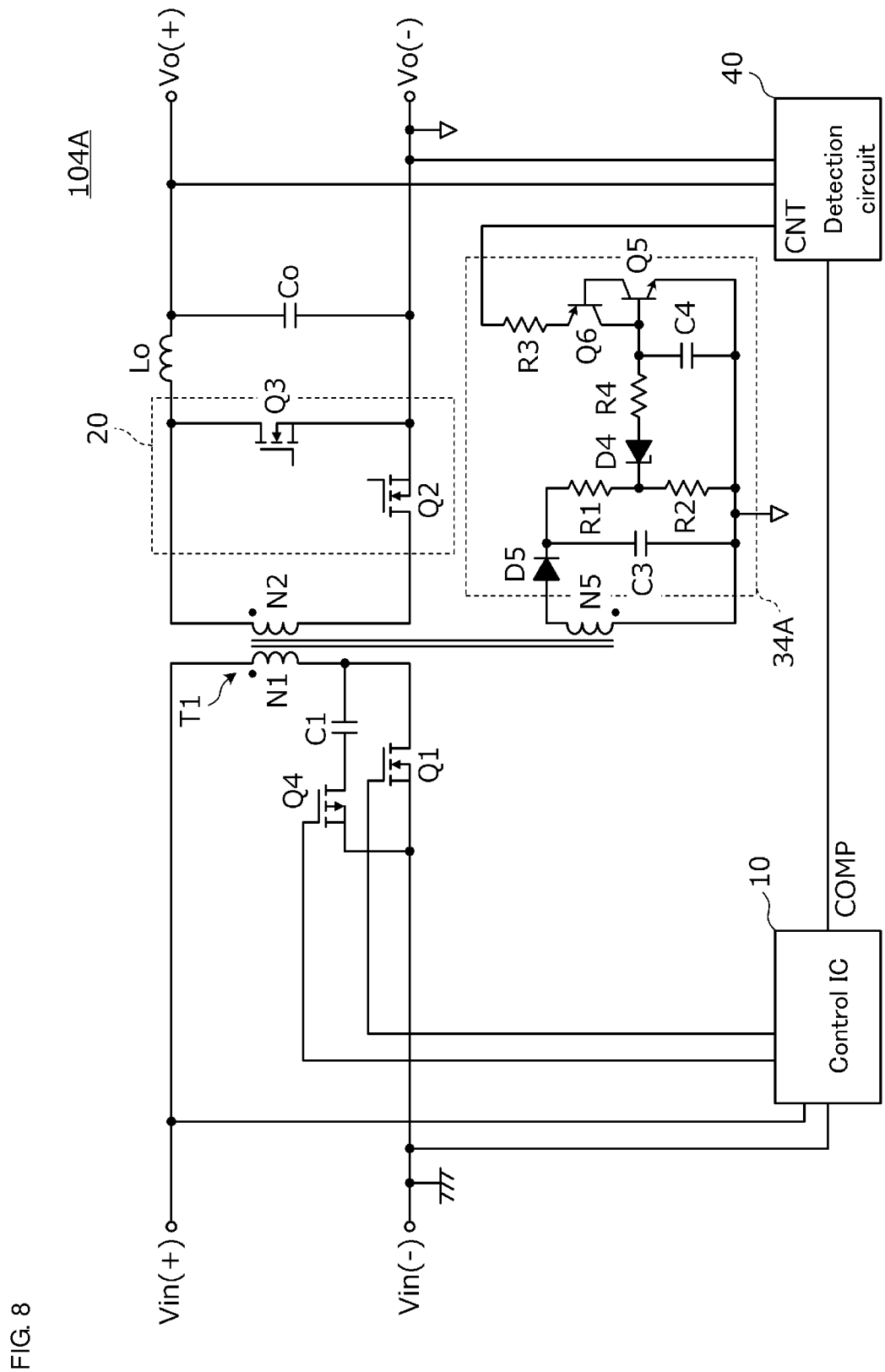
FIG. 8 is a circuit diagram of a DC-DC converter 104A according to a fourth preferred embodiment of the present invention.

FIG. 8 is a circuit diagram of a DC-DC converter 104A according to the fourth preferred embodiment. The transformer T1 included in the DC-DC converter 104A includes an auxiliary winding N5. A reset voltage detection circuit 34A is connected to the auxiliary winding N5. The reset voltage detection circuit 34A detects, using the voltage of the auxiliary winding N5, the magnitude of the reset voltage which is generated when excitation energy accumulated in the transformer T1 is reset, and supplies a control signal to the output voltage detection circuit 40 when it exceeds a predetermined threshold value. Other configurations are the same or substantially the same as those of the DC-DC converter 103 described in the third preferred embodiment.

The configuration and operation of the reset voltage detection circuit 34A are as follows. The reset voltage detection circuit 34A includes the resistors R1, R2, R3, and R4, the capacitors C3 and C4, the Zener diode D4, the diode D5, and the transistors Q5 and Q6. The diode D5 rectifies the voltage of the auxiliary winding N5 and the capacitor C3 smooths the voltage. The resistors R1 and R2 define a voltage dividing circuit that divides a voltage of the capacitor C3. The Zener diode D4 becomes conductive when a divided voltage exceeds a Zener voltage of the Zener diode D4. The resistor R4 and the capacitor C4 define a time constant circuit. The two transistors Q5 and Q6 define a latch circuit of a thyristor structure.

Since a voltage of the auxiliary winding N5 of the transformer T1 is proportional to the voltage of the primary winding N1, when the reset voltage which is generated in the primary winding exceeds a predetermined value, the Zener diode D4 becomes conductive. With this, when the transistor Q5 is turned ON, the transistor Q6 is also turned ON. Thus, a control signal is supplied to the output voltage detection circuit 40.

When the reset voltage detection circuit 34A detects that the magnitude of the voltage which is generated in the auxiliary winding N5 of the transformer T1 exceeds the predetermined threshold value, the output voltage detection circuit 40 changes the feedback voltage such that the on-duty of the main switch element Q1 becomes short. Thus, the reset voltage which is generated in the primary winding N1 and the secondary winding N2 of the transformer T1 is restricted.

Figure 9:
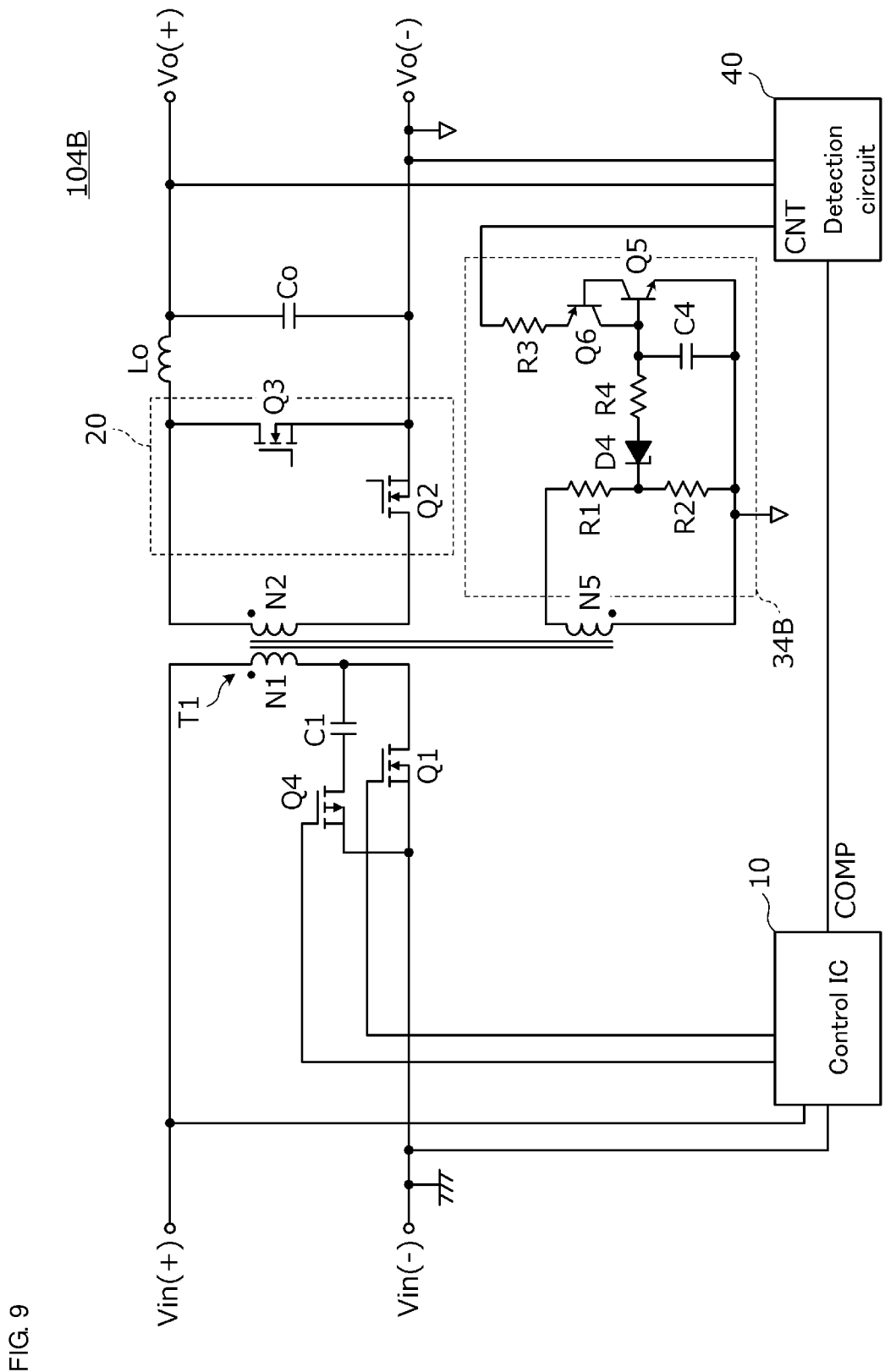
FIG. 9 is a circuit diagram of another DC-DC converter 104B in the fourth preferred embodiment of the present invention.

FIG. 9 is a circuit diagram of another DC-DC converter 104B according to the fourth preferred embodiment of the present invention. The DC-DC converter 104B is different from the DC-DC converter 104A illustrated in FIG. 8 in the configuration of a reset voltage detection circuit 34B.

In the reset voltage detection circuit 34B, there is no diode D5 and no capacitor C3 illustrated in FIG. 8. Thus, even if the voltage of the auxiliary winding N5 is not rectified and smoothed, when the voltage which is generated in the auxiliary winding N5 exceeds the predetermined value, the Zener diode D4 becomes conductive. Therefore, by the same action as described above, the reset voltage which is generated in the primary winding N1 and the secondary winding N2 of the transformer T1 is restricted.

Fifth Preferred Embodiment

A fifth preferred embodiment of the present invention describes an example of a DC-DC converter including a reset voltage suppressing circuit that reduces an on-duty of a main switch element.

Figure 10:
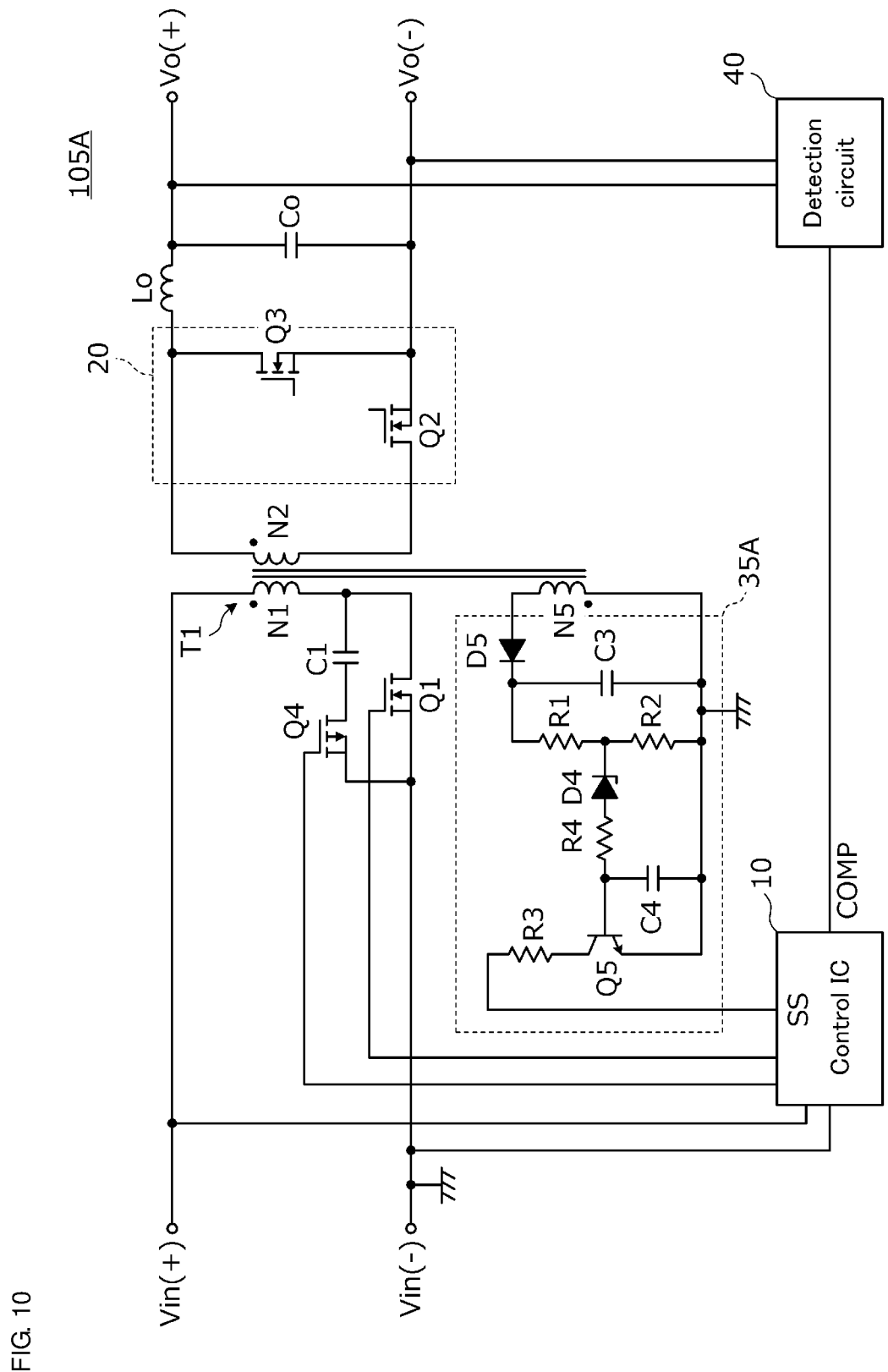
FIG. 10 is a circuit diagram of a DC-DC converter 105A according to a fifth preferred embodiment of the present invention.

FIG. 10 is a circuit diagram of a DC-DC converter 105A according to the fifth preferred embodiment. In the DC-DC converter 105A, a reset voltage detection circuit 35A is connected to the auxiliary winding N5 of the transformer T1. The reset voltage detection circuit 35A detects, using the voltage of the auxiliary winding N5, the magnitude of a reset voltage which is generated when excitation energy accumulated in the transformer T1 is reset, and supplies a control voltage corresponding to the detected voltage to the SS terminal of the control circuit 10. Other configurations are the same or substantially the same as those of the DC-DC converter 101A described in the first preferred embodiment.

The reset voltage detection circuit 35A includes the resistors R1, R2, R3, and R4, the capacitors C3 and C4, the Zener diode D4, the diode D5, and the transistor Q5. The diode D5 rectifies the voltage of the auxiliary winding N5 and the capacitor C3 smooths the voltage. The resistors R1 and R2 define a voltage dividing circuit that divides a voltage of the capacitor C3. The Zener diode D4 becomes conductive when a divided voltage exceeds a Zener voltage of the Zener diode D4. The resistor R4 and the capacitor C4 define a time constant circuit. When the Zener diode D4 becomes conductive, the transistor Q5 is turned ON.

As already described in the first preferred embodiment, the SS terminal of the control circuit 10 is the soft start control terminal, and a ramp voltage waveform for the soft start control is generated therein by a constant current charging circuit defined by a capacitor externally attached to this terminal and an internal constant current circuit.

When the voltage of the auxiliary winding N5 exceeds the predetermined value, the reset voltage detection circuit 35A turns ON the transistor Q5, thus drawing a current from the SS terminal. Accordingly, the soft start control acts in a pseudo manner and the on-duty of the main switch element Q1 decreases. By this operation, the reset voltage which is generated in the transformer T1 is restricted, and the main switch element Q1 is protected from the reset voltage which is generated in the primary winding of the transformer T1. Similarly, the rectifier switch element Q2 is protected from the reset voltage which is generated in the secondary winding N2 of the transformer T1.

Figure 11:
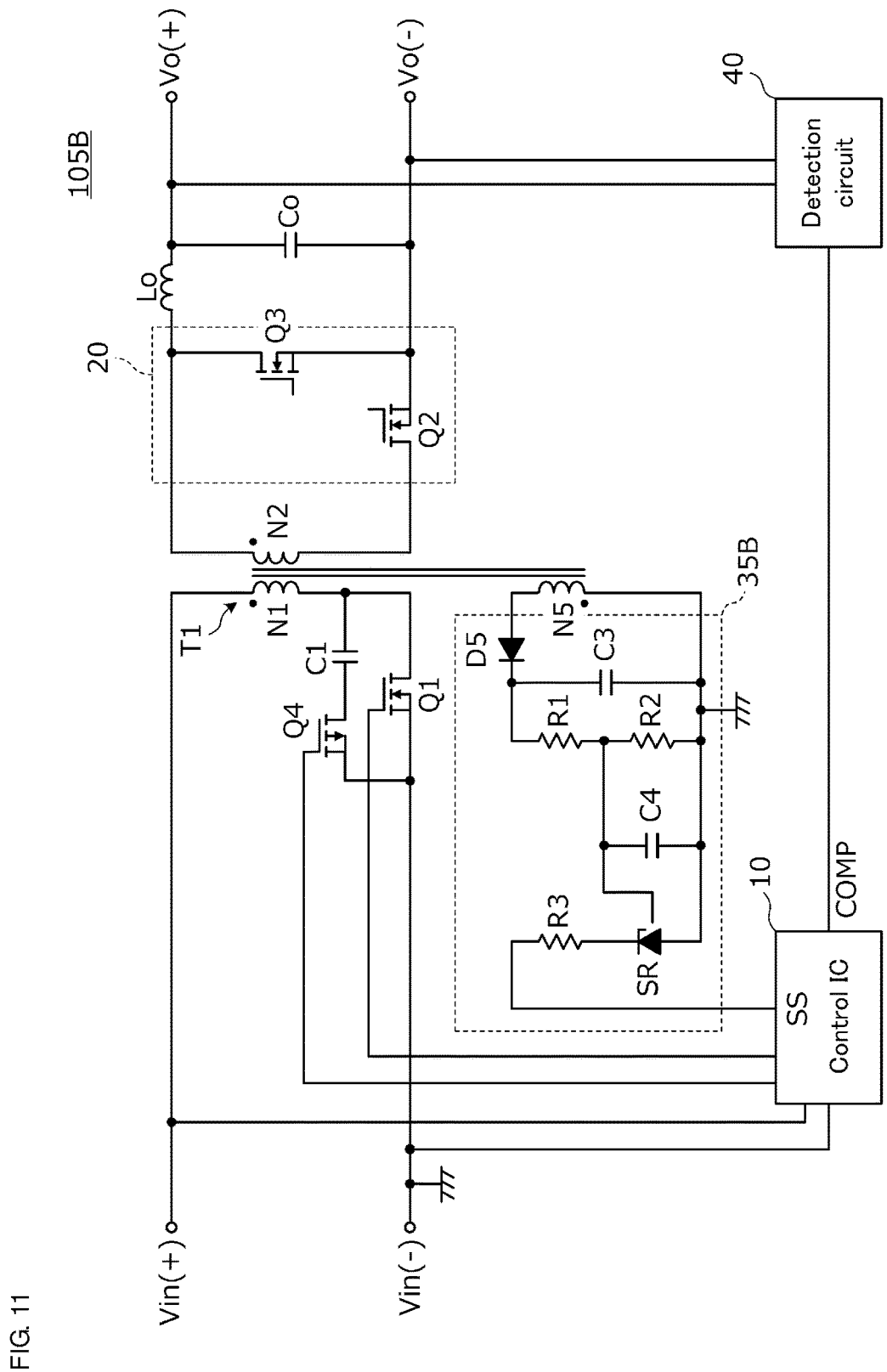
FIG. 11 is a circuit diagram of another DC-DC converter 105B in the fifth preferred embodiment of the present invention.

FIG. 11 is a circuit diagram of another DC-DC converter 105B according to the fifth preferred embodiment of the present invention. The DC-DC converter 105B is different from the DC-DC converter 105A illustrated in FIG. 10 in the configuration of a reset voltage detection circuit 35B.

The reset voltage detection circuit 35B includes the resistors R1, R2, and R3, the capacitors C3 and C4, the diode D5, and a shunt regulator SR. The diode D5 rectifies the voltage of the auxiliary winding N5 and the capacitor C3 smooths the voltage. The resistors R1 and R2 define a voltage dividing circuit that divides a voltage of the capacitor C3. The shunt regulator SR draws a current from the SS terminal of the control circuit 10 using the divided voltage as a reference voltage. Accordingly, when the voltage of the auxiliary winding N5 exceeds the predetermined value, the soft start control acts in a pseudo manner and the on-duty of the main switch element Q1 decreases.

Figure 12:
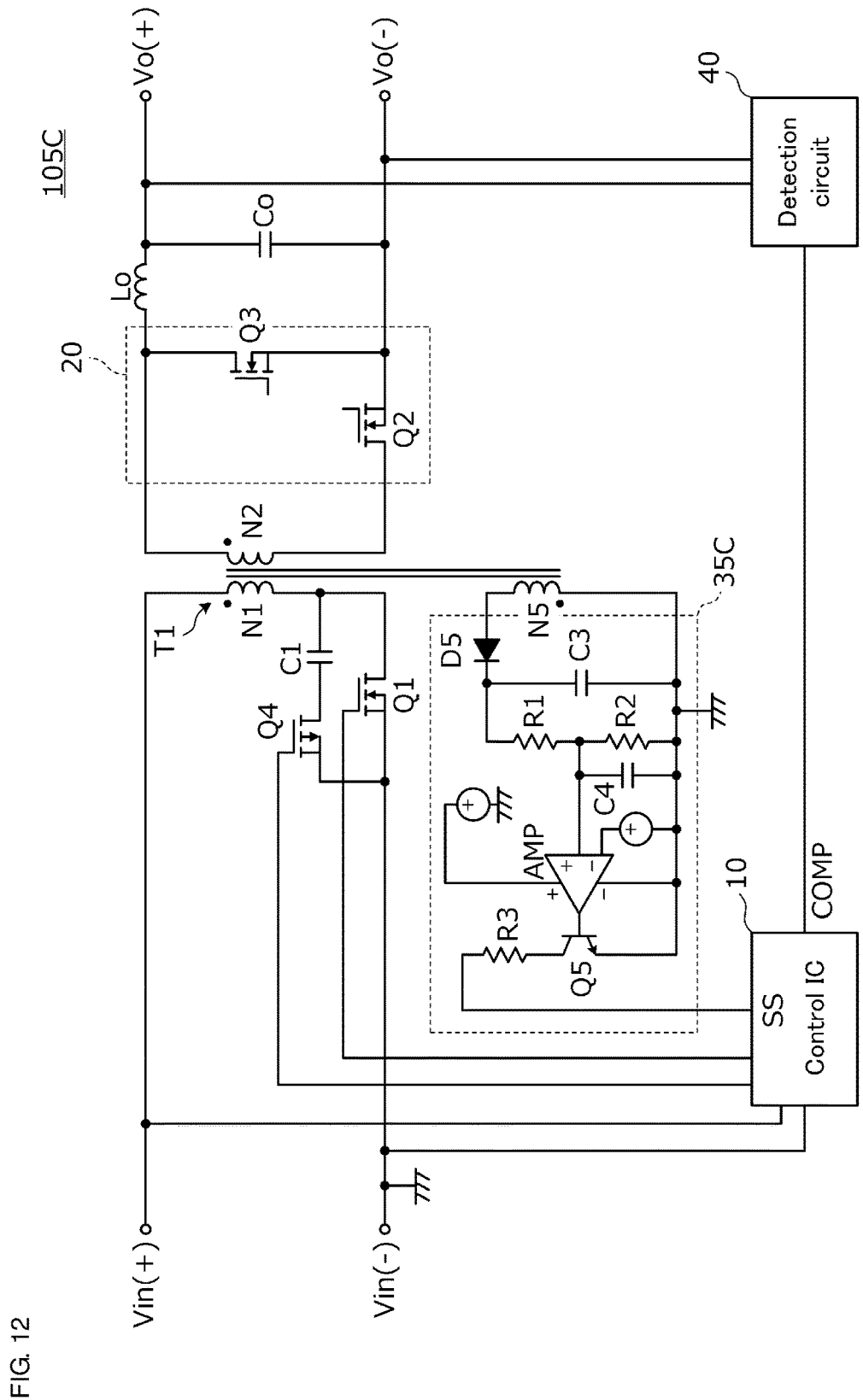
FIG. 12 is a circuit diagram of still another DC-DC converter 105C in the fifth preferred embodiment of the present invention.

FIG. 12 is a circuit diagram of still another DC-DC converter 105C according to the fifth preferred embodiment of the present invention. The DC-DC converter 105C is different from the DC-DC converter 105A illustrated in FIG. 10 in the configuration of a reset voltage detection circuit 35C.

The reset voltage detection circuit 35C includes the resistors R1, R2, and R3, the capacitors C3 and C4, the diode D5, and an error amplifier AMP. The diode D5 rectifies the voltage of the auxiliary winding N5 and the capacitor C3 smooths the voltage. The resistors R1 and R2 define a voltage dividing circuit that divides a voltage of the capacitor C3. The error amplifier AMP amplifies a differential voltage of the divided voltage with respect to the reference voltage, and drives the transistor Q5. Accordingly, as the voltage of the auxiliary winding N5 increases, the pseudo soft start control acts stronger and the on-duty of the main switch element Q1 decreases.

Sixth Preferred Embodiment

A sixth preferred embodiment of the present invention describes an example of a DC-DC converter which detects a reset voltage on the secondary side of a transformer using a voltage of an auxiliary winding.

Figure 13:
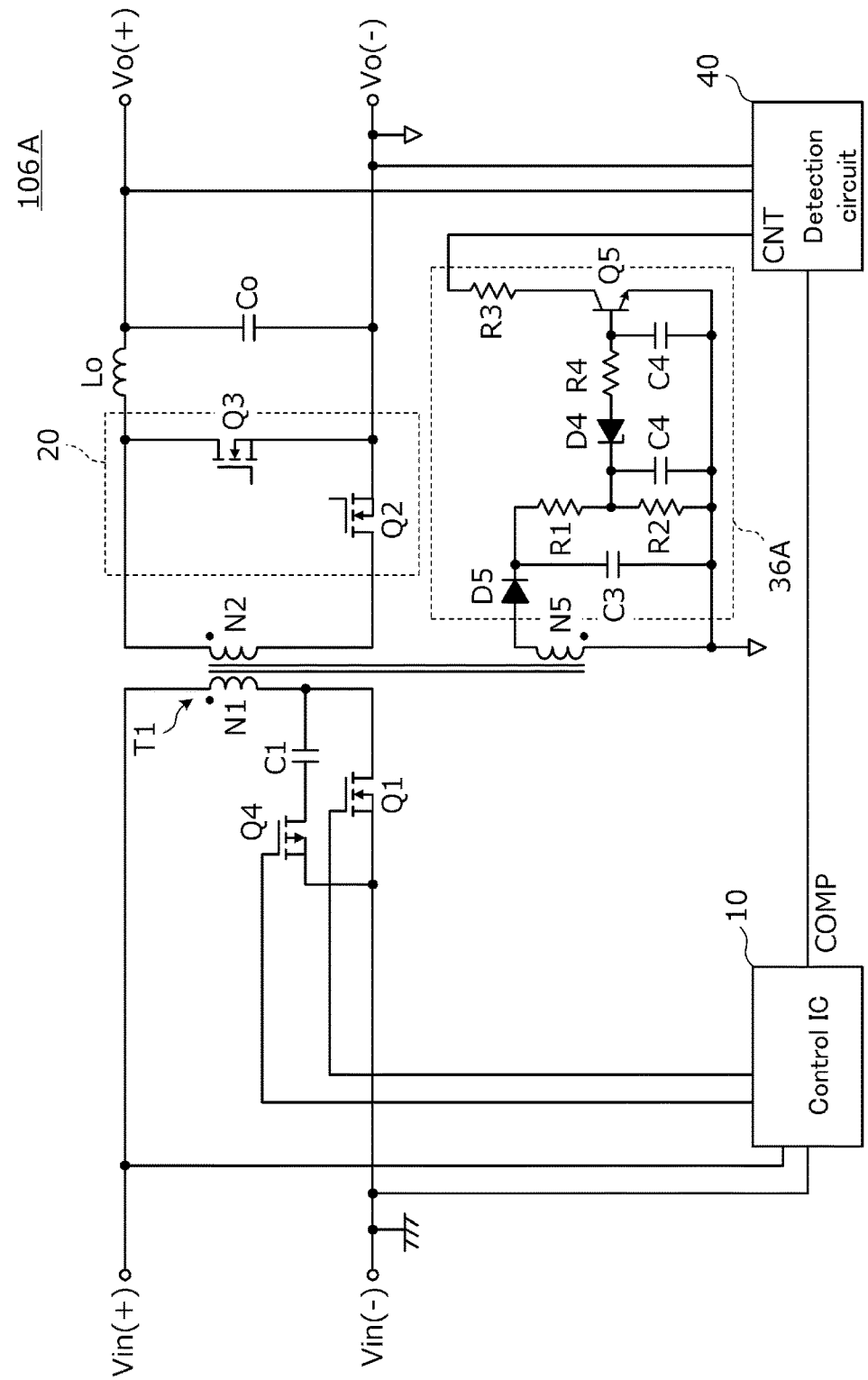
FIG. 13 is a circuit diagram of a DC-DC converter 106A according to a sixth preferred embodiment of the present invention.

FIG. 13 is a circuit diagram of a DC-DC converter 106A according to the sixth preferred embodiment. A reset voltage detection circuit 36A is connected to the auxiliary winding N5 of the transformer T1 in the DC-DC converter 106A. The reset voltage detection circuit 36A detects, using the voltage of the auxiliary winding N5, the magnitude of the reset voltage which is generated when excitation energy accumulated in the transformer T1 is reset, and supplies a control signal to the output voltage detection circuit 40 when it exceeds a predetermined threshold value. The configuration of the reset voltage detecting circuit 36A is the same or substantially the same as that of the reset voltage detecting circuit 35A illustrated in FIG. 10. Other configurations are the same or substantially the same as those of the DC-DC converter 103 described in the third preferred embodiment.

When the voltage of the auxiliary winding N5 of the transformer T1 exceeds the predetermined value, the reset voltage detection circuit 36A pulls down the control terminal CNT of the output voltage detection circuit 40.

The output voltage detection circuit 40 changes a feedback voltage to the control circuit 10 such that the on-duty of the main switch element Q1 becomes short with decrease in the voltage of the control terminal CNT. Thus, the reset voltage which is generated in the primary winding N1 and the secondary winding N2 of the transformer T1 is restricted.

Figure 14:
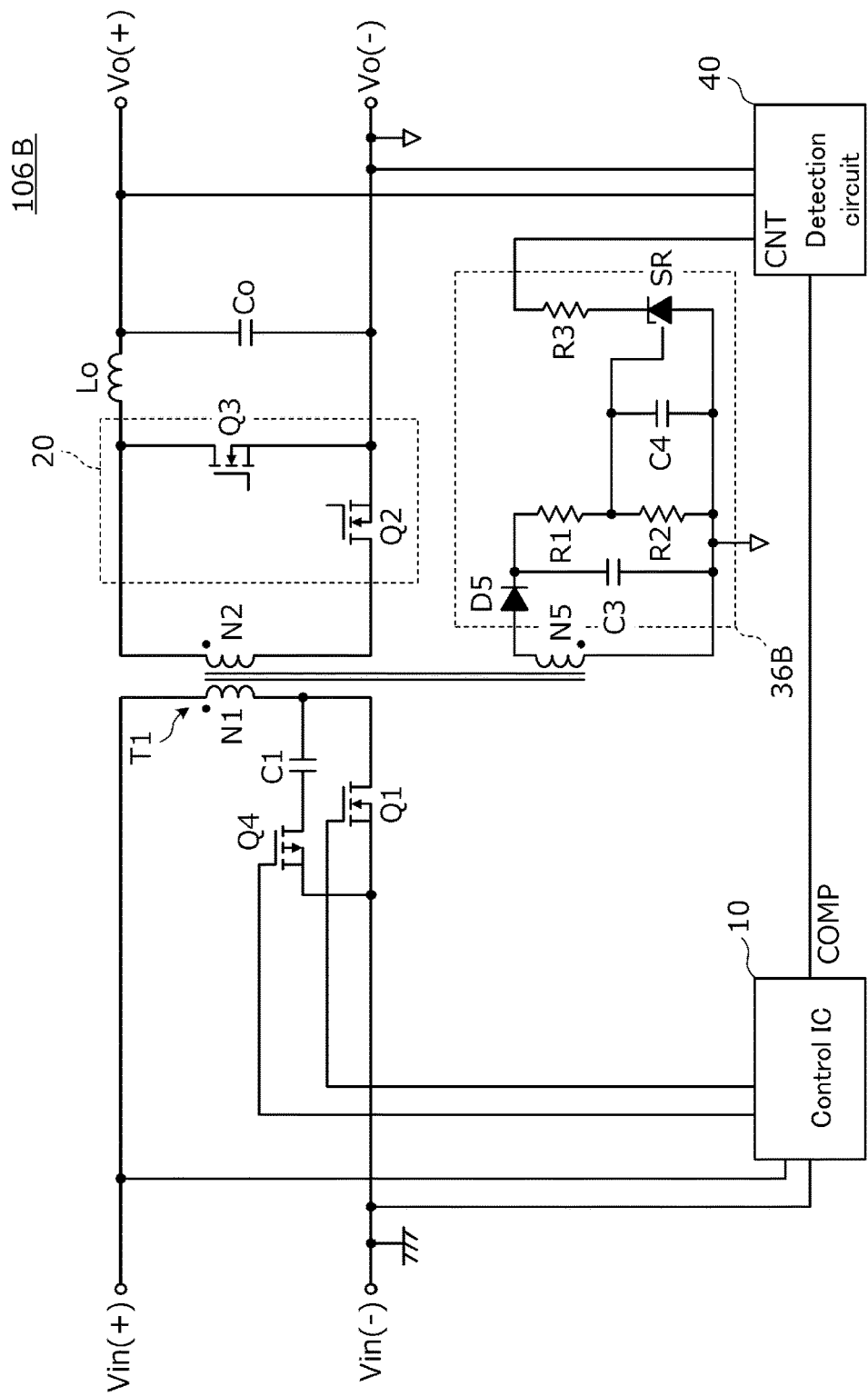
FIG. 14 is a circuit diagram of another DC-DC converter 106B in the sixth preferred embodiment of the present invention.

FIG. 14 is a circuit diagram of another DC-DC converter 106B according to the sixth preferred embodiment of the present invention. The DC-DC converter 106B is different from the DC-DC converter 106A illustrated in FIG. 13 in the configuration of the reset voltage detection circuit 36B.

The reset voltage detection circuit 36B includes the resistors R1, R2, and R3, the capacitors C3 and C4, the diode D5, and the shunt regulator SR. The diode D5 rectifies the voltage of the auxiliary winding N5 and the capacitor C3 smooths the voltage. The resistors R1 and R2 define a voltage dividing circuit that divides a voltage of the capacitor C3. The shunt regulator SR draws a current from the SS terminal of the control circuit 10 using the divided voltage as a reference voltage. Accordingly, when the voltage of the auxiliary winding N5 exceeds the predetermined value, the reset voltage detection circuit 36B pulls down the control terminal CNT of the output voltage detection circuit 40. Thus, the on-duty of the main switch element Q1 decreases.

Figure 15:
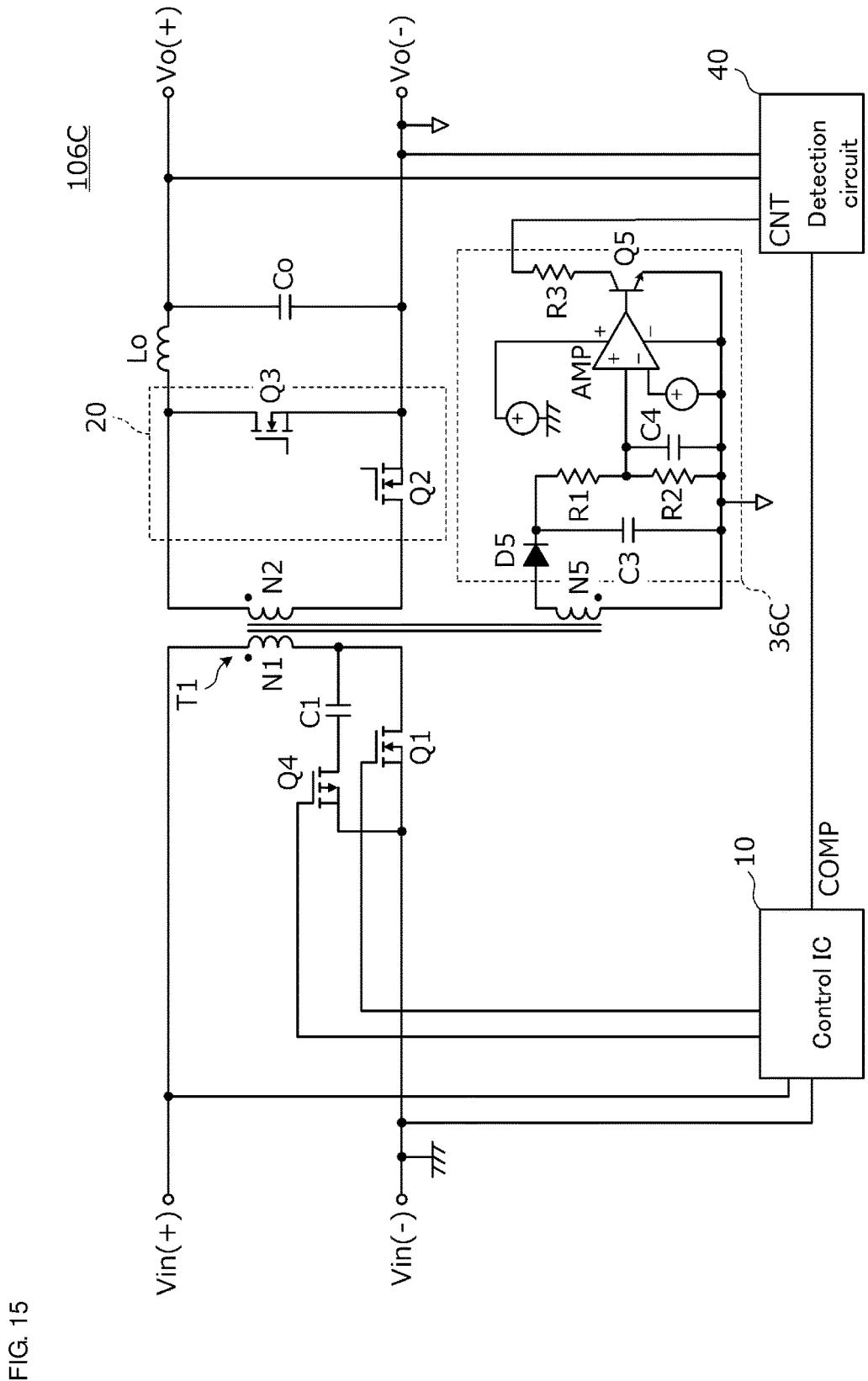
FIG. 15 is a circuit diagram of still another DC-DC converter 106C in the sixth preferred embodiment of the present invention.
Figure 16:
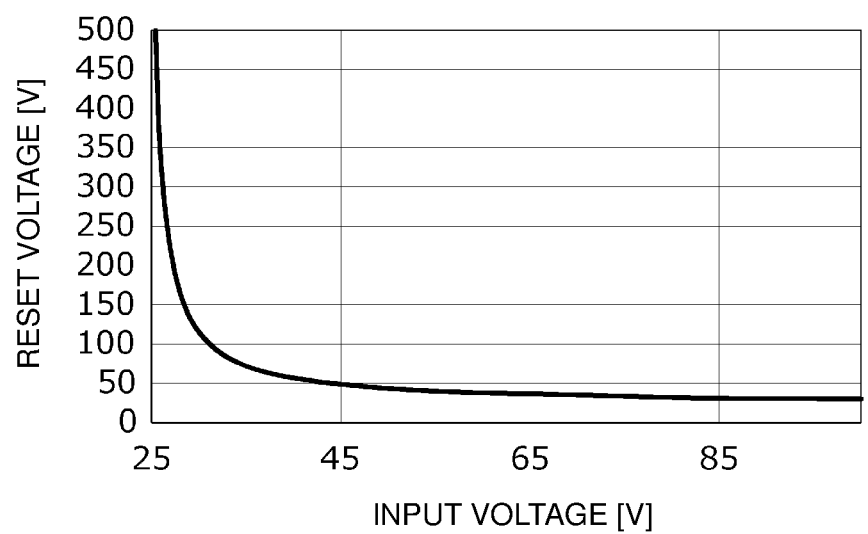
FIG. 16 is a diagram illustrating an example of a relationship between an input voltage to a conventional DC-DC converter and a reset voltage.

FIG. 15 is a circuit diagram of another DC-DC converter 106C according to the sixth preferred embodiment of the present invention. The DC-DC converter 106C is different from the DC-DC converter 106A illustrated in FIG. 13 in the configuration of a reset voltage detection circuit 36C.

The reset voltage detection circuit 36C includes the resistors R1, R2, and R3, the capacitors C3 and C4, the diode D5, and the error amplifier AMP. The diode D5 rectifies the voltage of the auxiliary winding N5 and the capacitor C3 smooths the voltage. The resistors R1 and R2 define a voltage dividing circuit that divides a voltage of the capacitor C3. The error amplifier AMP amplifies a differential voltage of the divided voltage with respect to the reference voltage, and drives the transistor Q5. Accordingly, as the voltage of the auxiliary winding N5 increases, a potential of the control terminal CNT of the output voltage detection circuit 40 is decreased. Thus, the on-duty of the main switch element Q1 decreases.

Although in each of the preferred embodiments described above, a forward DC-DC converter has been described, the present invention may be similarly applied to a DC-DC converter in which excitation and reset of a transformer are performed at an asymmetric voltage. For example, preferred embodiments of the present invention are similarly applicable to a flyback DC-DC converter.

In addition, in each of the above-described preferred embodiments, an example has been described in which the on-duty is reduced by drawing the voltage of the terminal (UVLO terminal) that monitors the input voltage of the switching control IC, the input terminal (COMP terminal) of the PWM modulator, or the terminal (SS terminal) for the soft start control, but the present invention is not limited thereto. For example, the reset voltage may be restricted by controlling a voltage of a terminal related to continuation/stop of oscillation of the switching control IC. For example, output may be stopped by, for example, drawing (lowering) a voltage of the internal power supply voltage terminal (Vcc terminal) of the switching control IC or the terminal (OUT_A terminal) thereof that outputs the gate signal to the main switch element Q1.

Further, in each of the above-described preferred embodiments, the control signal is supplied to the switching control IC so as to reduce the on-duty. However, when a switching element driving IC is connected between the switching control IC and the main switch element, output thereof may be stopped by, for example, drawing (lowering) a voltage of an enabling terminal (ENABLE terminal), a power supply terminal (Vcc terminal), and a gate signal output terminal (OUT terminal) of the driving IC.

Further, the output may be stopped by lowering a voltage of a power supply terminal of the output voltage detection circuit 40 on the secondary side, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A DC-DC converter comprising:
   a voltage input portion that receives a DC voltage;
   a voltage output portion to which a load is connected;
   a transformer that includes at least a primary winding and a secondary winding;
   a main switch element that is provided between the voltage input portion and the primary winding of the transformer;
   a rectifier circuit that is provided between the voltage output portion and the secondary winding of the transformer; and
   a reset voltage suppressing circuit that detects a magnitude of a reset voltage which is generated when excitation energy accumulated in the transformer is reset and reduces a voltage which is applied to the main switch element in accordance with the magnitude of the reset voltage; wherein
   the reset voltage suppressing circuit reduces a voltage which is applied to the main switch element when the magnitude of the reset voltage exceeds a predetermined threshold value;

the rectifier circuit is a synchronous rectifier circuit which includes a rectifier switch element provided between the voltage output portion and the secondary winding of the transformer, and switches the rectifier switch element in synchronization with variation in a secondary winding voltage of the transformer; and the reset voltage suppressing circuit detects the magnitude of the reset voltage using a voltage which is applied to the rectifier switch element.

2. The DC-DC converter according to claim 1, wherein the reset voltage suppressing circuit detects the magnitude of the reset voltage using a voltage which is applied to the main switch element.

3. The DC-DC converter according to claim 1, wherein the transformer includes an auxiliary winding; and the reset voltage suppressing circuit detects the magnitude of the reset voltage using a voltage of the auxiliary winding of the transformer.

4. The DC-DC converter according to claim 3, further comprising a reset voltage detection circuit connected to the auxiliary winding that detects, using a voltage of the auxiliary winding, the magnitude of the reset voltage generated when the excitation energy accumulated in the transformer is reset.

5. The DC-DC converter according to claim 4, wherein the reset voltage detection circuit includes resistors, capacitors, a Zener diode, a diode, and transistors;

the diode rectifies the voltage of the auxiliary winding; and one of the capacitors smooths the voltage of the auxiliary winding.

6. The DC-DC converter according to claim 1, wherein the reset voltage suppressing circuit reduces an on-duty of the main switch element.

7. The DC-DC converter according to claim 6, wherein the reset voltage suppressing circuit keeps the main switch element in an OFF state.

8. The DC-DC converter according to claim 1, wherein the main switch element is a FET, and an active clamp circuit which is connected in parallel between a drain and a source of the main switch element and restricts the reset voltage which is applied to the main switch element is provided.

9. The DC-DC converter according to claim 1, wherein the rectifier circuit includes a rectifier switch element connected in series to the secondary winding and a commutation switch element connected to the secondary winding.

10. The DC-DC converter according to claim 9, further comprising:

a reset voltage detection circuit provided between a drain of the rectifier switch element and ground; wherein the reset voltage detection circuit detects the magnitude of the reset voltage which is generated in the secondary winding.

11. The DC-DC converter according to claim 1, further comprising:

a control circuit connected to the voltage input portion; and an output voltage detection circuit providing on a side secondary side of the transformer; wherein the output voltage detection circuit detects a voltage at the voltage output portion and applies a feedback voltage to the control circuit.

12. The DC-DC converter according to claim 1, wherein the reset voltage detection circuit is provided between a drain of the main switch element and ground.

13. The DC-DC converter according to claim 1, wherein the rectifier circuit includes a rectifier diode and an inductor connected in series to the secondary winding, and a commutation diode connected to the secondary winding.

* * * * *